United States Patent
Lee et al.

(10) Patent No.: US 10,045,231 B2
(45) Date of Patent: Aug. 7, 2018

(54) METHOD OF EXPANDING TRANSMISSION RANGE AND BASE STATION APPARATUS USING THE SAME

(71) Applicant: RESEARCH & BUSINESS FOUNDATION SUNGKYUNKWAN UNIVERSITY, Suwon-si (KR)

(72) Inventors: Tae-Jin Lee, Suwon-si (KE); Dong In Kim, Seongnam-si (KR); Yunmin Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 201 days.

(21) Appl. No.: 14/974,426

(22) Filed: Dec. 18, 2015

(65) Prior Publication Data

US 2016/0295424 A1 Oct. 6, 2016

(30) Foreign Application Priority Data

Mar. 31, 2015 (KR) .................... 10-2015-0045582

(51) Int. Cl.
  *H04W 24/02* (2009.01)
  *H04W 74/08* (2009.01)
  *H04W 16/08* (2009.01)

(52) U.S. Cl.
  CPC .......... *H04W 24/02* (2013.01); *H04W 16/08* (2013.01); *H04W 74/0833* (2013.01)

(58) Field of Classification Search
  CPC .. H04W 24/02; H04W 16/08; H04W 74/0833
  See application file for complete search history.

(56) References Cited

U.S. PATENT DOCUMENTS

| | | | | |
|---|---|---|---|---|
| 6,094,418 A | * | 7/2000 | Soumiya | H04L 12/5602 370/231 |
| 2010/0034177 A1 | * | 2/2010 | Santhanam | H04W 74/0883 370/338 |
| 2010/0056158 A1 | * | 3/2010 | Du | H04W 36/0055 455/438 |
| 2012/0063302 A1 | | 3/2012 | Damnjanovic et al. | |

(Continued)

FOREIGN PATENT DOCUMENTS

| | | |
|---|---|---|
| KR | 10-2012-0063302 A | 12/2012 |
| KR | 10-2013-0059395 A | 6/2013 |
| KR | 10-2015-0018760 A | 2/2015 |

OTHER PUBLICATIONS

G. C. Madueno et al. "Massive M2M Access with Reliability Guaranteesin LTE Systems", Communications (ICC), IEEE International Conference Feb. 10, 2015, 6 pages.

(Continued)

*Primary Examiner* — Christine Ng
(74) *Attorney, Agent, or Firm* — NSIP Law

(57) ABSTRACT

Disclosed herein is a method of expanding, by a small cell BS, a transmission range in a heterogeneous network. The method includes estimating a number of success devices which successfully access a small cell BS through a contention based on an idle Random Access Opportunity (RAO) and comparing the estimated number of expected access device with an actual number of measured success devices and determining a transmission range expansion distance.

19 Claims, 10 Drawing Sheets

(56) References Cited

U.S. PATENT DOCUMENTS

2013/0223235 A1    8/2013  Hu et al.
2015/0085753 A1*   3/2015  Chen .................... H04W 16/32
                                                           370/328

OTHER PUBLICATIONS

Office Action issued by KIPO dated Feb. 16, 2016 for the corresponding KR Application No. 10-2015-0045582.
Korean Notice of Allowance dated Aug. 18, 2016, in counterpart Korean Application No. 10-2015-0045582. (5 pages in Korean).
Woo-Jong JO et al., Novel Pico-cell Range Expansion with Adaptive RACH Resource Allocation for Random Access on M2M Devices, ICWMC 2014: The Tenth International Conference on Wireless and Mobile Communications, 2014, 8 pages in English.

* cited by examiner

METHOD OF EXPANDING TRANSMISSION RANGE AND BASE STATION APPARATUS USING THE SAME

Priority to Korean patent application number 2015-0045582 filed on Mar. 31, 2015, the entire disclosure of which is incorporated by reference herein, is claimed.

BACKGROUND OF THE INVENTION

Field of the Invention

The present invention relates to a Machine-to-Machine (M2M) communication method in a Heterogeneous Network (HetNet) environment and, more particularly, to a method of controlling the resources and power of a Base Station (BS) for M2M communication in an HetNet environment.

Discussion of the Related Art

In a next-generation network, Machine-to-Machine (M2M) communication has been in the spotlight as an important technology capable of creating new services. M2M communication is characterized in that communication between devices is performed in such a manner that control of a user has been minimized unlike in existing communication by a user. Such an M2M characteristic may be applied to various applications, such as a sensor device for measuring electricity and the amount of water used, a wearable device capable of checking the physical state of a user, and a logistics system. As surrounding common things become capable of wireless communication, it is expected that M2M communication devices will be deployed on a large scale.

In line with such a trend, a Machine Type Communication (MTC) device which is different from an existing cellular device and becomes the subject of M2M communication has been defined in Long Term Evolution (LTE). Furthermore, there has been defined a Random Access CHannel (RACH) process performed by MTC devices (hereinafter called devices) in a Physical Random Access CHannel (PRACH) allocated by a BS for communication.

FIG. 1 is a diagram showing an example of the allocation or a PRACH of the uplink frequency resources of a BS.

Referring to FIG. 1, in Frequency Division Duplexing (FDD) LTE, uplink resources include Physical Uplink Control CHannels (PUCCHs) and a Physical Uplink Shared CHannel (PUSCH). A frame having a length of 10 ms includes 10 subframes of 1 ms in length. In this case, a PRACH may be allocated to 0.5, 1, 2, 3, 5, and 10 subframes within a single frame. In FIG. 1, a PRACH has been allocated to two subframes.

FIG. 2 is a diagram showing an RACH process (random access process) performed by a device.

Referring to FIG. 2, for random access, a device selects one of 64 preambles in a PRACH and sends the selected preamble at step S210. In this case, if two or more devices 202 send the same preamble in the same PRACH, a collision occurs. After the preamble transmission, a BS 204 sends a Random Access Response (RAR) and schedules the devices that corresponding to successfully received preambles at step S220. In this case, the BS 204 may include an eNodeB for mobile communication, such as 3GPP, LTE, LTE-A, or WIBRO, such as a NodeB. The device 202 performs data transmission in the scheduled resources at step S230. In response thereto, the BS 204 sends a contention resolution to the device 202 at step S240.

In a next-generation network along with M2M communication, a HetNet which assists a shadow area that is difficult to be served by an existing BS due to the installation of small BS and which may distribute a load has been in the spotlight. In a HetNet, a pico BS, that is, a small BS type providing service to a relatively small area compared to a macro BS, that is, an existing BS, coexists and operates. In this case, the small BS may be called a small cell BS and may include a femto BS and a micro BS in addition to a pico BS. That is, although a small BS is hereinafter described as only a pico cell, it may be easily understood that the small BS can be applied to a femto cell and a microcell.

In the introduced conventional technologies, there are problems in that a pico BS in a HetNet does not have an algorithm for distributing a load by taking into consideration the amount of access of surrounding devices after the pico BS is installed other than the distribution of a load, a fixed value is allocated to the number of PRACHs allocated by a BS for random access, and proper scheduling is not performed on the surrounding devices of a pico BS because the amount of access of surrounding devices is not variably handled.

SUMMARY OF THE INVENTION

An object of the present invention is to provide a method of expanding a transmission range through the estimation of the number of accessed devices in an HeNet environment.

Another object of the present invention is to provide a method of expanding, by a small cell BS, a transmission range and a base station apparatus using the method, which are capable of increasing efficiency of the random access of a device in such a manner that a pico BS controls a transmission range depending on the number of surrounding devices and distributes the load of a macro BS through an algorithm capable of dynamically allocating resources in an HeNet environment in order to distribute a load of devices that are expected to be present on a large scale in M2M communication.

In an embodiment, a method of expanding, by a small cell BS, a transmission range in a heterogeneous network may include estimating the number of success devices which successfully access a small cell BS through a contention based on an idle Random Access Opportunity (RAO) and determining a transmission range expansion distance by comparing the estimated number of expected access device with the actual number of measured success devices.

Estimating the number of success devices which successfully access the small cell BS may include calculating a ratio of idle RAOs in the contention frame of a previous random access process, estimating the number of devices which have attempted access using the calculated idle RAO ratio inversely, and estimating the number of successfully accessed devices based on the calculated number of access attempt devices.

The number of successfully accessed devices in a specific i-th contention frame may be calculated by a multiplication of a success probability value calculated using $$\hat{P}_{succ,i} = \hat{N}_{PUE,i} \frac{1}{L_{pico,i}} \left(1 - \frac{1}{L_{pico,i}}\right)^{\hat{N}_{PUE,i}-1}$$

and a contention frame size value $L_{pico,i}$, wherein $\hat{N}_{PUE,i}$ the estimated number of devices which attempt access to the small cell BS in the i-th contention frame and $\hat{P}_{succ,i}$ is a probability that devices of $\hat{N}_{PUE,i}$ may be successfully accessed when the devices perform a contention in a contention frame having the size of $L_{pico,i}$.

Comparing the estimated number of expected access device with the actual number of measured success devices and determining the transmission range expansion distance may include determining whether a difference between the number of expected success devices and the number of measured success devices exceeds a threshold, calculating a current transmission range if, as a result of the determination, it is determined that the difference between the number of expected success devices and the number of measured success devices exceeds the threshold, and calculating the transmission range expansion distance in which the number of access attempt devices may be accommodated based on the current transmission range.

The transmission range expansion distance may be calculated using a ratio of a maximum number of devices which may be accommodated by a macro BS and a transmission radius of the macro BS.

The method may further include calculating a power increment necessary to expand a transmission range by incorporating the transmission range expansion distance based on a signal intensity value to which the path loss values of a small cell and a macro BS have been applied.

The method may further include determining a transmission power increment in which the signal intensity values of the small cell BS and the macro BS become equal and calculating transmission power in a next contention frame by taking into consideration a maximum value and minimum value of the transmission power based on the determined transmission power increment.

The method may further include calculating the number of RAOs which maximizes the number of successfully accessed devices when a random contention is performed in order to allocate resources corresponding to the number of access attempt devices, wherein the number of RAOs is a size of a contention frame.

The number of RAOs which maximizes the number of successfully accessed devices when the random contention is performed may be calculated based on an optimum contention frame size calculated by differentiating the number of RAOs which maximizes a success probability of $$\hat{P}_{succ,i} = \hat{N}_{PUE,i} \frac{1}{L_{pico,i}} \left(1 - \frac{1}{L_{pico,i}}\right)^{\hat{N}_{PUE,i}-1}.$$

The number of RAOs which maximizes the number of successfully accessed devices when the random contention is performed may be calculated by taking into consideration the calculated optimum contention frame size and a maximum contention frame size which may be allocated.

The RAO value may be calculated by multiplying the number of PRACH by the number of preambles.

In an embodiment, a small cell BS apparatus for transmission range expansion in a HetNet may include an access device estimation unit configured to estimate the number of success devices which successfully access a small cell BS through a contention based on an idle RAO, and a transmission range expansion distance determination unit configured to compare the estimated number of expected access device with the actual number of measured success devices and determine a transmission range expansion distance.

The access device estimation unit may include an idle RAO ratio calculation unit configured to calculate a ratio of idle RAOs in a contention frame of a previous random access process, an access attempt device estimation unit configured to estimate the number of devices which have attempted access using the calculated idle RAO ratio inversely, and an access success device estimation unit configured to estimate the number of successfully accessed devices based on the calculated number of access attempt devices.

The number of successfully accessed devices in a specific i-th contention frame may be calculated by a multiplication of a success probability value calculated using $$\hat{P}_{succ,i} = \hat{N}_{PUE,i} \frac{1}{L_{pico,i}} \left(1 - \frac{1}{L_{pico,i}}\right)^{\hat{N}_{PUE,i}-1}$$

and a contention frame size value $L_{pico,i}$, wherein $\hat{N}_{PUE,i}$ is the estimated number of devices which attempt access to the small cell BS in the i-th contention frame and $\hat{P}_{succ,i}$ is a probability that devices of $\hat{N}_{PUE,i}$ may be successfully accessed if the devices perform a contention in a contention frame having the size of $L_{pico,i}$.

The transmission range expansion distance determination unit may include a determination unit configured to determine whether a difference between the number of expected success devices and the number of measured success devices exceeds a threshold, a current transmission range calculation unit configured to calculate a current transmission range if, as a result of the determination, it is determined that the difference between the number of expected success devices and the number of measured success devices exceeds the threshold, and an expansion distance calculation unit configured to calculate the transmission range expansion distance in which the number of access attempt devices may be accommodated based on the current transmission range.

The transmission range expansion distance may be calculated using a ratio of a maximum number of devices which may be accommodated by a macro BS and a transmission radius of the macro BS.

The small cell BS apparatus may further include a power increment calculation unit configured to calculate a power increment necessary to expand a transmission range by incorporating the transmission range expansion distance based on a signal intensity value to which the path loss values of a small cell and a macro BS have been applied.

The power increment calculation unit may determine a transmission power increment in which the signal intensity values of the small cell BS and the macro BS become equal and calculate transmission power in a next contention frame by taking into consideration a maximum value and minimum value of the transmission power based on the determined transmission power increment.

The small cell BS apparatus may further include an optimum contention frame size determination unit configured to calculate the number of RAOs which maximizes the number of successfully accessed devices when a random contention is performed in order to allocate resources corresponding to the number of access attempt devices.

In an embodiment, a system for determining, by a small cell BS, a transmission range in a HetNet may include a plurality of devices configured to attempt random access to the small cell BS or a macro BS, the macro BS configured to receive random access requests from some of the devices, and the small cell BS configured to estimate the number of success devices which access the small cell BS based on an idle RAO, compare the estimated number of expected access devices with the actual number of measured success devices, and determine a transmission range expansion distance in order to process random access requests from some of the devices while coexisting with the macro BS.

DETAILED DESCRIPTION OF THE EMBODIMENTS

Figure 1:
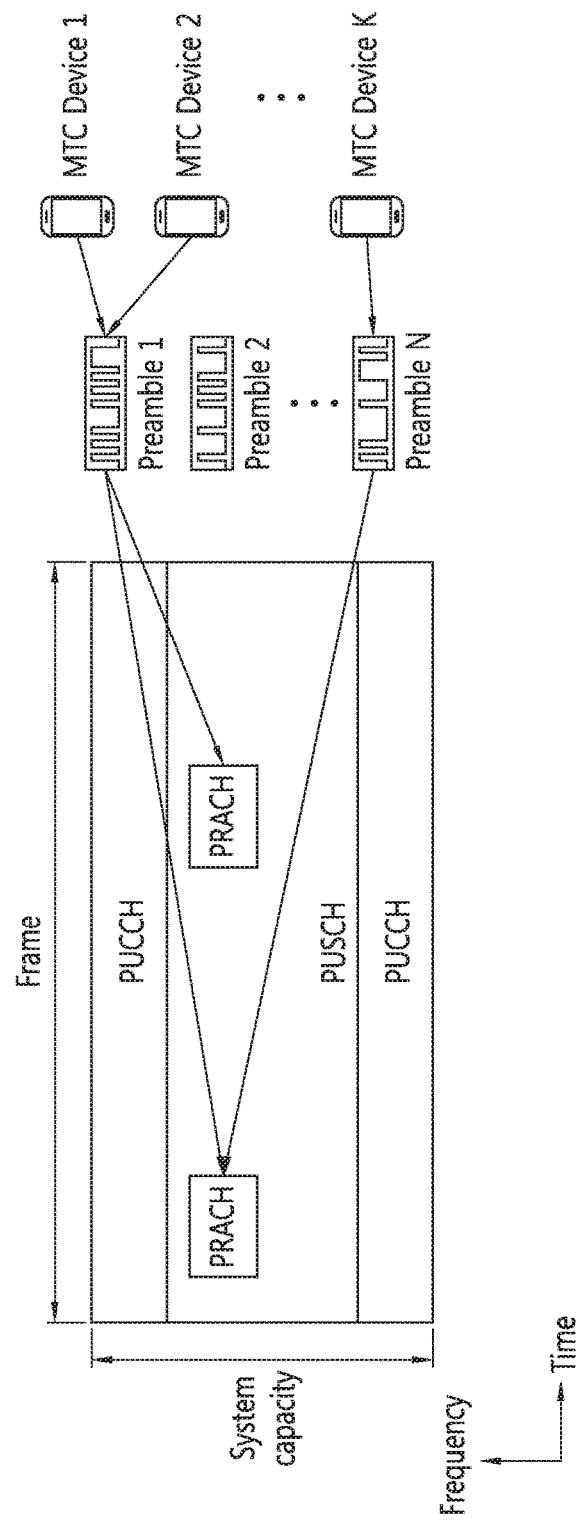
FIG. 1 is a diagram showing an example of the allocation or a PRACH of the uplink frequency resources of a BS.
Figure 2:
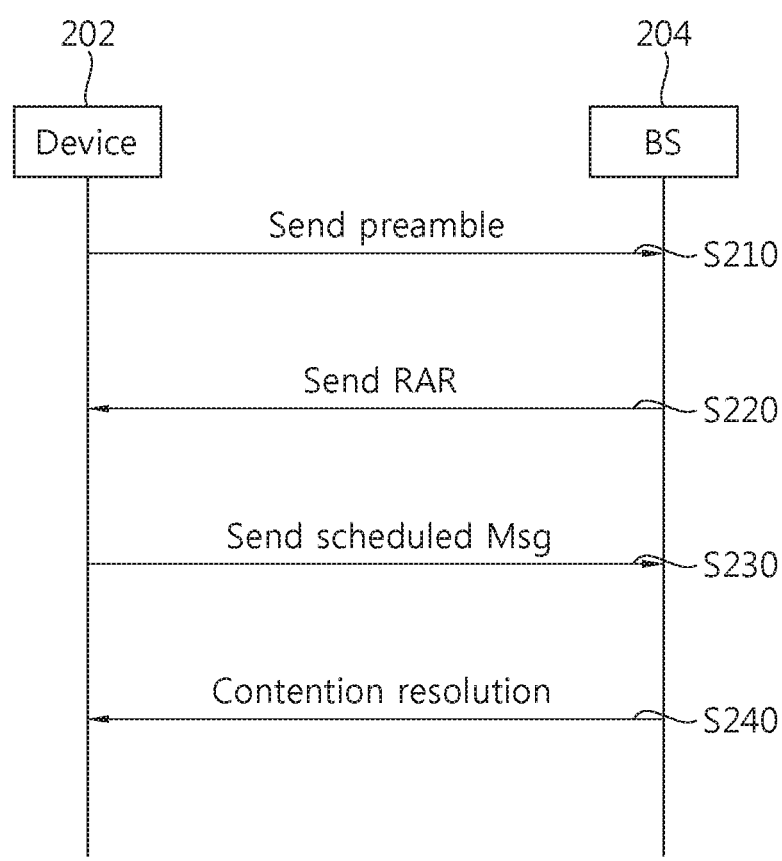
FIG. 2 is a diagram showing an RACH process (random access process) performed by a device.

The present invention may be modified in various ways and may be implemented to have several embodiments. Specific embodiments are illustrated in the drawings and are described in detail.

It is however to be understood that the present invention is not intended to be limited to the specific embodiments and the present invention includes all modifications, equivalents, and substitutions which fall within the spirit and technical scope of the present invention.

Terms, such as the first and the second, may be used to describe various elements, but the elements should not be restricted by the terms. The terms are used to only distinguish one element from the other element. For example, a first element may be named a second element without departing from the scope of the present invention. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is said that one element is "directly connected" or "directly coupled" to the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

All terms used herein, unless otherwise defined, have the same meanings as those typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Hereinafter, some embodiments of the present invention are described in more detail with reference to the accompanying drawings. In describing the present invention, in order to help general understanding, the same reference numerals are used to denote the same elements throughout the drawings, and a redundant description of the same elements is omitted.

In this specification, an RACH process means a Random Access Opportunity (RAO) contention. In an RACH process of FDD LTE, a device selects one of a maximum of 64 preambles for each RACH resource of PRACHs allocated thereto and sends the selected preamble. Accordingly, the number of cases in which devices may select preambles in a single frame upon a RACH contention is the multiplication of the number of an RACH resource of PRACHs and the number of preambles. The multiplication value may be defined by an RAO. Accordingly, an RACH contention may be diagrammed as a contention for selecting, by devices, an RAO in a single frame. In this case, the size L of a contention frame may be represented as a total number of RAOs. That is, a contention frame may mean the frame of a random access environment in which a contention is present.

Heterogeneous Network System for Transmission Range Expansion

Figure 3:
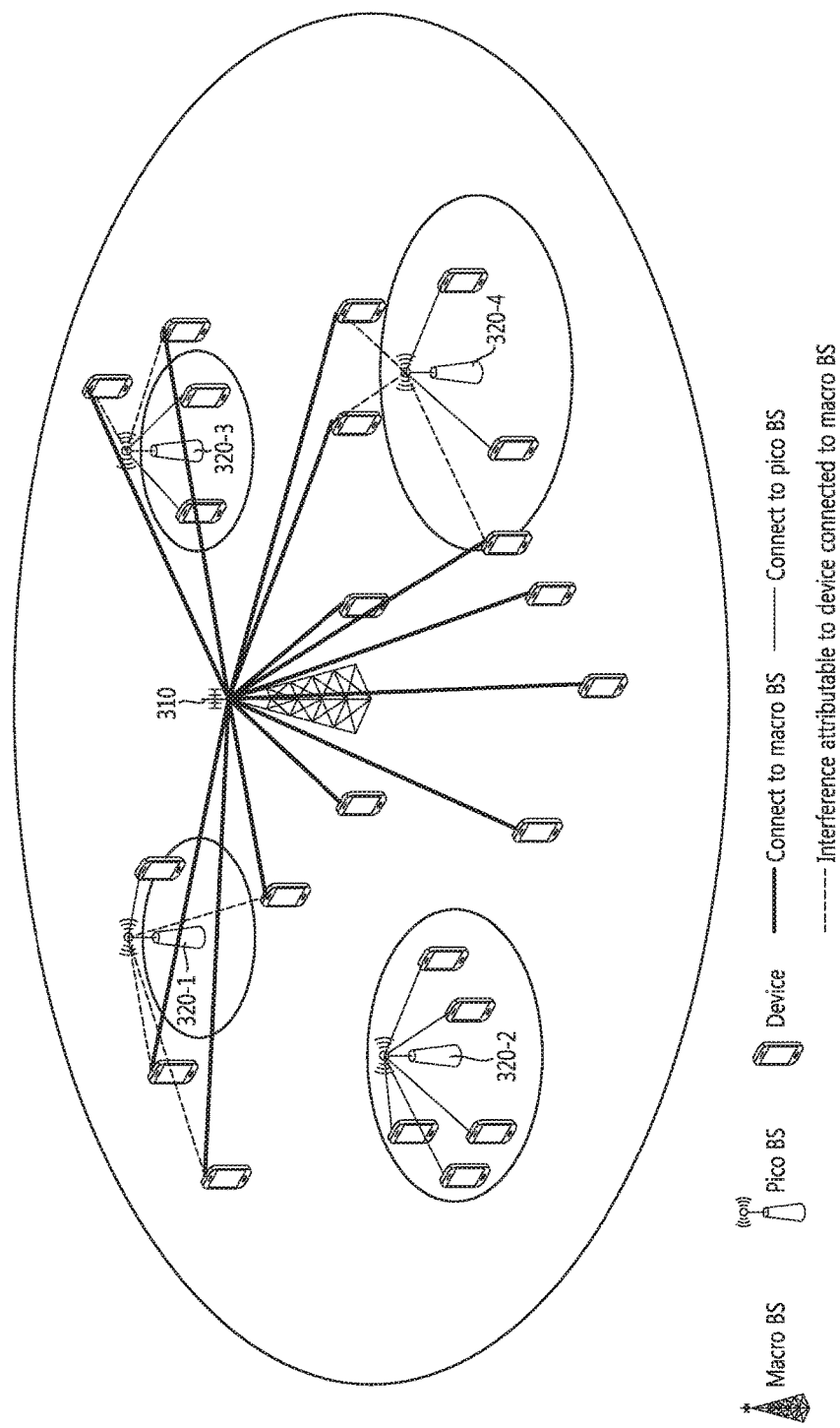
FIG. 3 is a diagram showing a Heterogeneous Network (HetNet) environment in which a method of expanding a transmission range is taken into consideration in accordance with an embodiment of the present invention.

FIG. 3 is a diagram showing a Heterogeneous Network (HetNet) environment in which a method of expanding a transmission range is taken into consideration in accordance with an embodiment of the present invention. As shown in FIG. 3, a HetNet system in accordance with an embodiment of the present invention may include a macro BS 310, small cell BSs 320-1~320-4 (shown as pico BSs in FIG. 3, but other small cell BSs (e.g., femto cells or micro cells) may be instead used), and a device (i.e., MTC Device).

Referring to FIG. 3, four pico BSs 320-1~320-4 are present in the macro BS 310. The devices attempt random access to the macro 310 or a pico BSs 320-1~320-4, corresponding to BS areas to which the devices belong, depending on their distributed locations. The pico BSs 1, 3, and 4 (i.e., 320-1, 320-3, and 320-4) receive interference signals attributable to devices connected to close macro BSs in the outskirts of a transmission range. The pico BS 320-2 may have small signal distortion attributable to interference because it does not receive a strong interference signal. In particular, interference attributable to a device that is placed at the edges of the transmission ranges of the pico BSs 320-1~320-4 and sends a signal to the macro BS 310 may have a great influence on devices which access the pico BSs 320-1~320-4. In order to prevent interference from the device placed at such a location, transmission range expansion according to an embodiment of the present invention may be used.

Method of Expanding, by Small Cell BS Apparatus, Transmission Range

Figure 4:
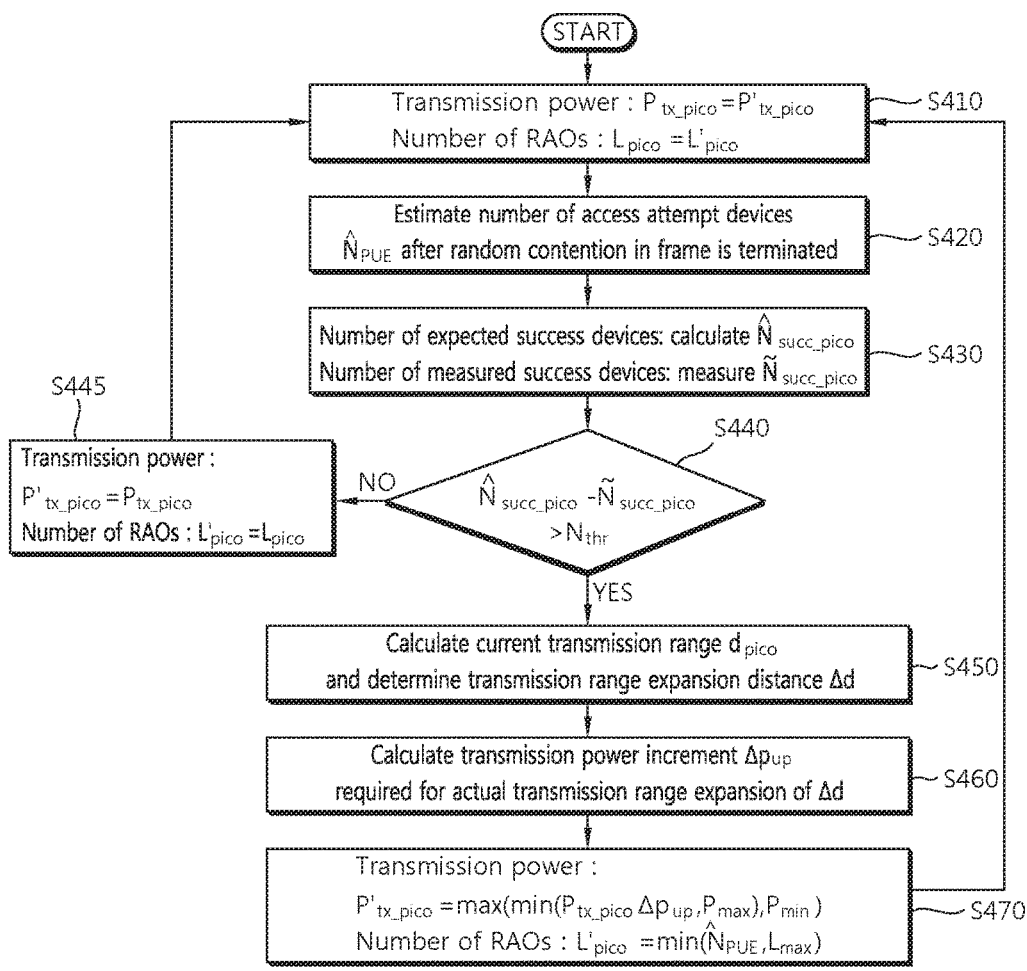
FIG. 4 is a flowchart schematically showing a method of expanding a transmission range in accordance with an embodiment of the present invention.

FIG. 4 is a flowchart schematically showing a method of expanding a transmission range in accordance with an embodiment of the present invention. In FIG. 4, for a description of a recursive operation, a symbol "i" indicative of the index of a specific contention frame has been omitted in all letters unlike in a letter marked thereafter. The marked letters have the same meaning as letters marked thereafter other than the meaning limited in a specific frame.

Referring to FIG. 4, first, a small cell BS configures a contention frame using initial values or transmission power and the number of Random Access Opportunities (RAO) that are determined at the random access process of a previous contention frame at step S410. After random access is terminated at the corresponding contention frame, the small cell BS estimates the number of access attempt devices at step S420. Thereafter, the small cell BS calculates the number of expected success devices using the estimated number of access attempt devices and measures the number of actual success devices at step S430. A method of estimating the number of devices which attempt access using an idle RAO ratio inversely may be used as a method of calculating the number of expected success devices in accordance with an embodiment of the present invention. Thereafter, the small cell BS determines whether a difference between the estimated number of expected success devices and the number of measured success devices is greater than a specific threshold at step S440. If, as a result of the determination, it is determined that the difference between the estimated number of expected success devices and the number of measured success devices is equal to or smaller than the threshold, the small cell BS provides random access as an opportunity by applying the previous transmission power and the number of RAOs to a next contention frame without a change of transmission range expansion, transmission power, and a contention frame size at step S445. If, as a result of the determination, it is determined that the difference between the estimated number of expected success devices and the number of measured success devices is greater than the threshold, the small cell BS may determine that some of the estimated number of expected success devices have failed in access. This may be caused by interference attributable to a device which accesses a macro BS. Accordingly, in order to accommodate some or all of such devices in the small cell BS, the small cell BS determines to expand a transmission range, calculates a current transmission range, and determines a transmission range expansion distance at step S450. Thereafter, the small cell BS calculates a power increment for the determined transmission range expansion at step S460. Thereafter, the small cell BS determines transmission power and the number of RAOs for random access in a next contention frame using the number of access attempt devices and the power increment determined at step S420 and at step S460 and configures a next contention frame using the determined transmission power and the number of RAOs at step S470. The process is described in more detail below with reference to FIGS. 5 to 7.

Method of Determining Whether to Expand Transmission Range

Figure 5:
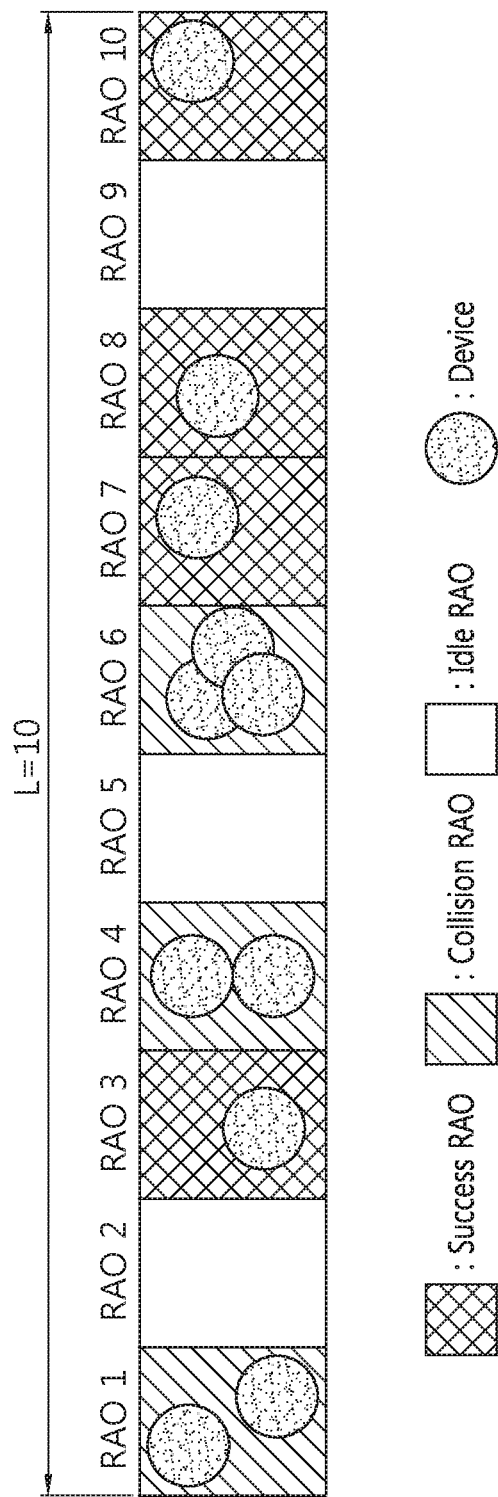
FIG. 5 is a diagram describing an RACH process, performed in Machine-to-Machine (M2M) communication, as a Random Access Opportunity (RAO) contention.

FIG. 5 is a diagram describing an RACH process, performed in Machine-to-Machine (M2M) communication, as a Random Access Opportunity (RAO) contention. That is, FIG. 5 shows the resource structures and content results of an RACH process which is performed on a BS by devices.

In accordance with an embodiment, FIG. 5 shows the results of contents of 11 devices using 10 RAOs. In the RAOs 1, 4, and 6, two or more devices select preambles, and thus a collision is generated. In the RAOs 3, 7, 8, and 10, devices successfully transmit respective preambles. The RAOs 2, 5, and 9 are idle RAOs in which all the devices have not selected a preamble.

After terminating a random access process in each contention frame, a pico BS performs an access device number estimation process for estimating the number of expected success devices by calculating the number of devices which have attempted random access. In order to estimate the number of access attempt devices, after terminating a random contention in an i-th contention frame, the pico BS calculates a corresponding ratio $\tilde{P}_{idle\_pico,i}$ as follows by measuring the number of idle RAOs that have not been selected by devices in the contention frame.

$$\tilde{P}_{idle\_pico,i} = \frac{\tilde{L}_{idle\_pico,i}}{L_{pico,i}} \quad (1)$$

In Equation 1, $L_{pico,i}$ and $\tilde{L}_{idle\_pico,i}$ denote the size of each i-th contention frame (i.e., the number of RAOs) and the number of idle RAOs in the i-th contention frame, respectively. The pico BS calculates the number of devices $\hat{N}_{PUE,i}$ which have attempted access to a corresponding pico BS in the i-th contention frame using the calculated ratio of idle RAOs.

$$\hat{N}_{PUE,i} = \frac{\log \hat{P}_{idle\_pico,i}}{\log\left(1 - \frac{1}{L_{pico,i}}\right)} \quad (2)$$

In Equation 2, a probability $\hat{P}_{succ,i}$ that the devices $\hat{N}_{PUE,i}$ may successfully access the corresponding pico BS when they perform a contention in the i-th contention frame having the size $L_{pico,i}$ is as follows.

$$\hat{P}_{succ,i} = \hat{N}_{PUE,i} \frac{1}{L_{pico,i}} \left(1 - \frac{1}{L_{pico,i}}\right)^{\hat{N}_{PUE,i}-1} \quad (3)$$

The pico BS may estimate the number of success devices $\hat{N}_{succ\_pico,i}$ which may be expected when a random contention is performed in the i-th contention frame as follows using the success probability of Equation 3.

$$\hat{N}_{succ\_pico,i} = \hat{P}_{succ,i} \times L_{pico,i} \quad (4)$$

Thereafter, the pico BS performs a transmission range expansion determination process for determining whether to expand a transmission range based on the estimated number of success devices.

The pico BS measures the number of actually measured success devices $\tilde{N}_{succ\_pico,i}$ in the i-th contention frame and compares the number of actually measured success devices with the value $\hat{N}_{succ\_pico,i}$ estimated in a previous process. If a threshold $N_{thr}$ is greater than the estimated value and the actual measured value, the pico BS determines an influence attributable to a process in which the signal of a device (i.e., macro device) belonging to a macro BS in the outskirts of a transmission area reaches the pico BS and actually accesses the macro BS and determines to expand a transmission range. Accordingly, the pico BS enables a macro device outside a current transmission area to belong the pico BS, thereby distributing a load of the macro BS and reducing the influence of an interference signal attributable to the macro device in the outside area.

Figure 6:
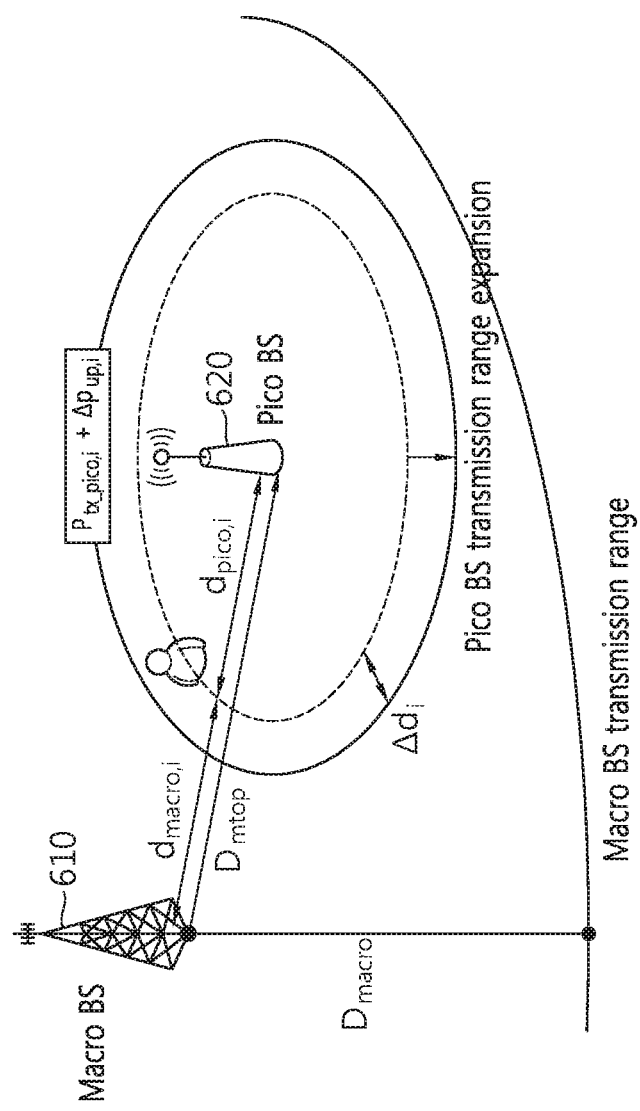
FIG. 6 is a diagram showing values required to calculate a transmission power increment $\Delta p_{up}$ in order for a pico BS to expand a transmission range in the method of expanding a transmission range in accordance with an embodiment of the present invention.

Method of Calculating Power Increment According to Expansion of Transmission Range FIG. 6 is a diagram showing values required to calculate a transmission power increment $\Delta p_{up}$ in order for a pico BS to expand a transmission range in the method of expanding a transmission range in accordance with an embodiment of the present invention.

Referring to FIG. 6, if transmission range expansion is performed, a pico BS 620 performs a transmission power determination process for calculating the amount of power for transmission range expansion. The pico BS 620 expands a transmission range so that all the number of random access attempt devices which has been calculated in a previous process may be accommodated. To this end, it is assumed that the devices are uniformly distributed in an area and the pico BS 620 is aware of its location and the location of a macro BS 610. The pico BS 620 starts the expansion of a transmission area and calculates the current transmission range of the pico BS 620. The transmission area is determined as the intensity of a signal. If the intensity of a signal received by the pico BS 620 is greater than the intensity of a signal received by the macro BS 610, the devices attempt random access to the pico BS 620. Accordingly, the current transmission range (prior to expansion) of the pico BS 620 becomes a point the intensity of the signal of the pico BS 620 becomes the same as the intensity of the signal of the macro BS 610 in a straight line with the macro BS 610. If a signal is transmitted by the pico or macro BS 620 or 610, the signal experiences path attenuation. In an i-th contention frame, the path loss value $PL_{macro,i}$ or $PL_{pico,i}$ of the signal transmitted by the pico or macro BS 620 or 610 is as follows.

$$PL_{macro,i}=128.1+37.6 \log(d_{macro,i}[km])$$

$$PL_{pico,i}=140.7+36.7 \log(d_{pico,i}[km]) \quad (5)$$

In Equation 5, $d_{macro,i}$ and $d_{pico,i}$ denote the distances of kilometers in which the intensities of two signals become the same in a straight line between the macro and pico BSs 610 and 620 on the basis of the macro and pico BSs 610 and 620 in the respective i-th contention frames. The signal intensities $RSRP_{macro,I}$ and $RSRP_{pico,i}$ at locations spaced apart from the macro and pico BSs 610 and 620 by the distances $d_{macro,i}$ and $d_{pico,i}$ in the respective i-th contention frames are calculated as follows using the path loss values of Equation 5.

$$RSRP_{macro,i}=10 \log(P_{tx\_macro,i})-PL_{macro,i}$$

$$RSRP_{pico,i}=10 \log(P_{tx\_pico,i})-PL_{pico,i} \quad (6)$$

In Equation 6, $P_{tx,macro,i}$ and $P_{tx,pico,i}$ denote transmission power of the macro BS 610 and transmission power of the pico BS 620 in the respective i-th contention frames. The pico BS 620 may calculate the distance $D_{mtop}$ in the straight line with the macro BS 610 based on location information and calculate the radius $d_{pico,i}$ of the current transmission range which satisfies "$RSRP_{macro,i}=RSRP_{pico,i}$" through a coalition with Equation 6 using a condition equation.

$$D_{mtop}=d_{macro,i}+d_{pico,i} \quad (7)$$

When a transmission area prior to expansion is calculated, the pico BS 620 may calculate an expansion distance $\Delta d$ required in the i-th contention frame in which the number of access attempt devices $\hat{N}_{PUE,i}$ in the i-th contention frame calculated in the process of estimating the number of accessed devices may be accommodated through the following proportional expression.

$$\hat{N}_{PUE,i}:(d_{pico,i}+\Delta d_i)^2 = N_{TOTAL}:D_{macro}^2 \quad (8)$$

In Equation 8, $N_{TOTAL}$ and $D_{macro}$ denote a maximum number of devices which may be accommodated by the macro BS 610 and the transmission radius of the macro BS 610, respectively. A transmission range expansion distance may be calculated using a method of calculating an expansion distance which satisfies a condition in which a ratio of a maximum number of devices which may be accommodated by the macro BS and the transmission radius of the macro BS becomes equal to a ratio of the estimated number of access devices and a value obtained by adding an expanded transmission range to a current transmission range. Then, the pico BS 620 may calculate the transmission power increment $\Delta p_{up,i}$ required for actual transmission range expansion based on the determined expansion distance using Equation 5, Equation 6, and Equation 7. More specifically, the path loss values in the pico and macro BSs 610 and 620 when the expanded transmission distance is applied may be expressed as follows.

$$PL'_{macro,i}=128.1+37.6 \log(d_{macro,i}-\Delta d_i)$$

$$PL'_{pico,i}=140.7+36.7 \log(d_{pico,i}+\Delta d_i) \quad (9)$$

The signal intensities $RSRP'_{macro,i}$ and $RSRP'_{pico,i}$ according to the path loss values in the expanded transmission range are expressed as follows.

$$RSRP'_{macro,i}=10 \log(P_{tx\_macro,i})-PL'_{macro,i}$$

$$RSRP'_{pico,i}=10 \log(P_{tx\_pico,i}+\Delta p_{up,i}))-PL'_{pico,i} \quad (10)$$

Furthermore, a transmission power increment $\Delta p_{up,i}$ satisfying "$RSRP'_{macro,i}=RSRP'_{pico,i}$" may be determined by associating Equation 9 and Equation 10. The pico BS 620 determines transmission power $P_{tx\_pico,i+1}$ in a next frame as follows by taking into consideration a maximum value $P_{max}$ and minimum value $P_{min}$ of the transmission power.

$$P_{tx\_pico,i+1}=\max(\min(P_{tx\_pico,i}+\Delta p_{up,i},P_{max}),P_{min}) \quad (11)$$

If the estimated number of success devices $\hat{N}_{succ\_pico,i}$ is smaller than the number of measured success devices $\tilde{N}_{succ\_pico,i}$ or is not greater than the threshold $N_{thr}$, the pico BS 620 does not perform transmission range expansion.

Method of Optimally Allocating Resources According to Transmission Range Expansion After determining transmission range expansion and transmission power in accordance with the method of determining transmission range expansion or the method of determining transmission power in accordance with an embodiment of the present invention, the pico BS performs an optimal resource allocation process for allocating efficient resources, corresponding to the number of access attempt devices $\hat{N}_{PUE,i}$ calculated in the access terminal number estimation process, to a next contention frame.

The number of optimal RAOs is a value which maximizes the number of successfully accessed devices when a random contention is performed. The value may be calculated by differentiating $L_{pico,i+1}$, that is, the number of RAOs (i.e., a contention frame size) which maximizes the success probability of Equation 3. The calculated optimum contention frame size is as follows.

$$L_{pico,i+1}=\hat{N}_{PUE,i} \tag{12}$$

The pico BS finally determines an optimum contention frame size when a next random contention is performed as follows by taking into consideration the calculated optimum contention frame size and a maximum contention frame size $L_{max}$ which may be allocated.

$$L_{pico,i+1}=\min(\hat{N}_{PUE,i},L_{max}) \tag{13}$$

Figure 7:
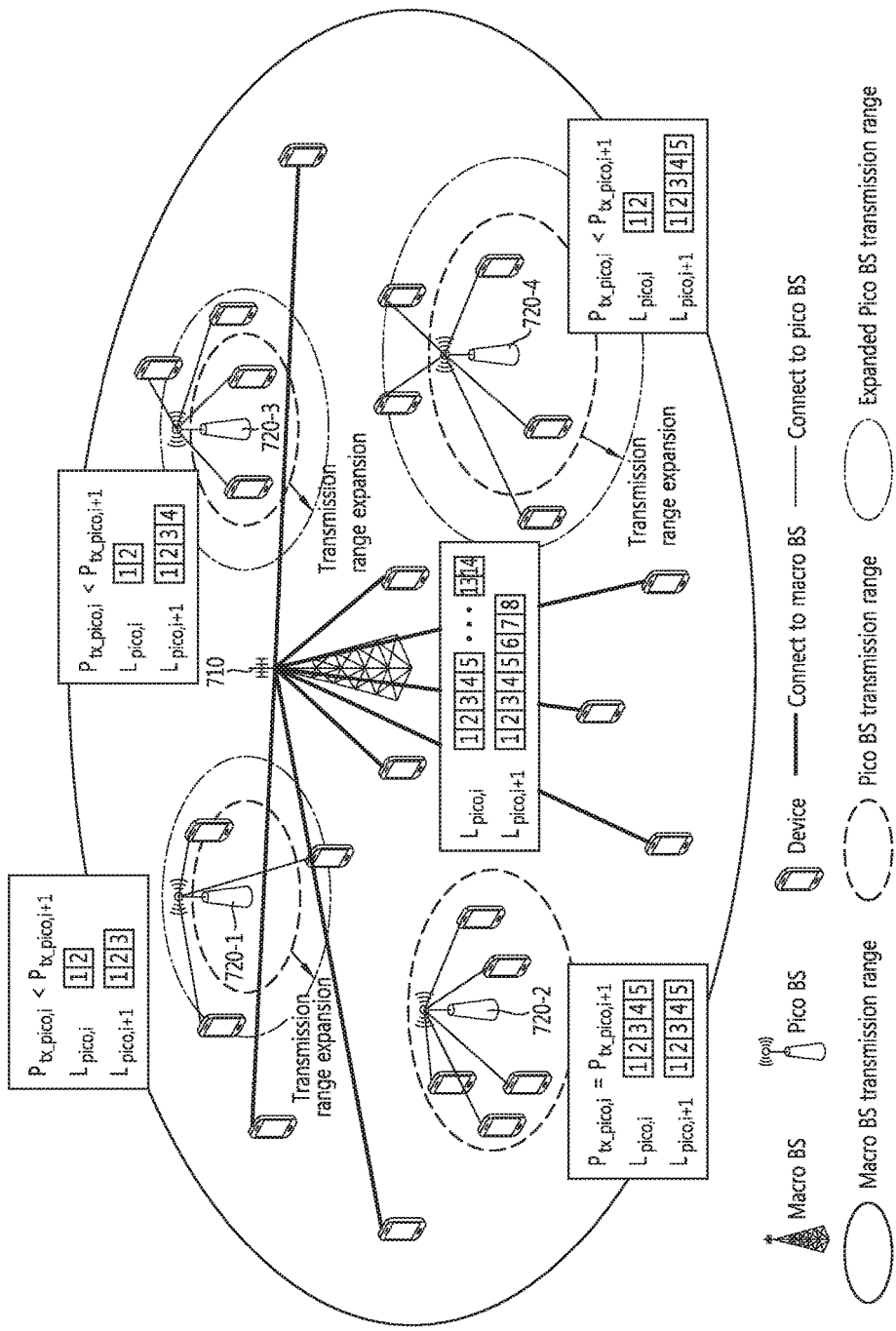
FIG. 7 is a diagram showing an HetNet environment to which the method of expanding a transmission range and a method of efficiently allocating resources have been applied in accordance with an embodiment of the present invention.

FIG. 7 is a diagram showing an HeNet environment to which the method of expanding a transmission range and a method of efficiently allocating resources have been applied in accordance with an embodiment of the present invention.

Referring to FIG. 7, after an i-th contention frame is terminated, each of pico BSs 1, 3, and 4 (720-1, 720-3, and 720-4) increases ($P_{tx\_pico,i}$<$P_{tx\_pico,i+1}$) transmission power in an (i+1)-th contention frame, performs transmission range expansion, and further accommodates devices closed to the outskirts of a transmission range. Furthermore, each pico BS determines the number of RAOs $L_{pico,i+1}$ of the (i+1)-th contention frame in response to the number of devices which may be additionally accommodated through transmission range expansion in accordance with Equation 12 and Equation 13. The pico BSs 1, 3, and 4 increase the existing number of RAOs, that is, 2, to respective values 3, 4, and 5.

The number of devices which access a macro BS 710 is reduced due to transmission range expansion of each of the pico BSs 720-1~720-4, and thus the macro BS 710 decreases the number of RAOs allocated accordingly. Accordingly, a load of the macro BS 710 can be reduced.

Small Cell BS Apparatus for Expanding Transmission Range

Figure 8:
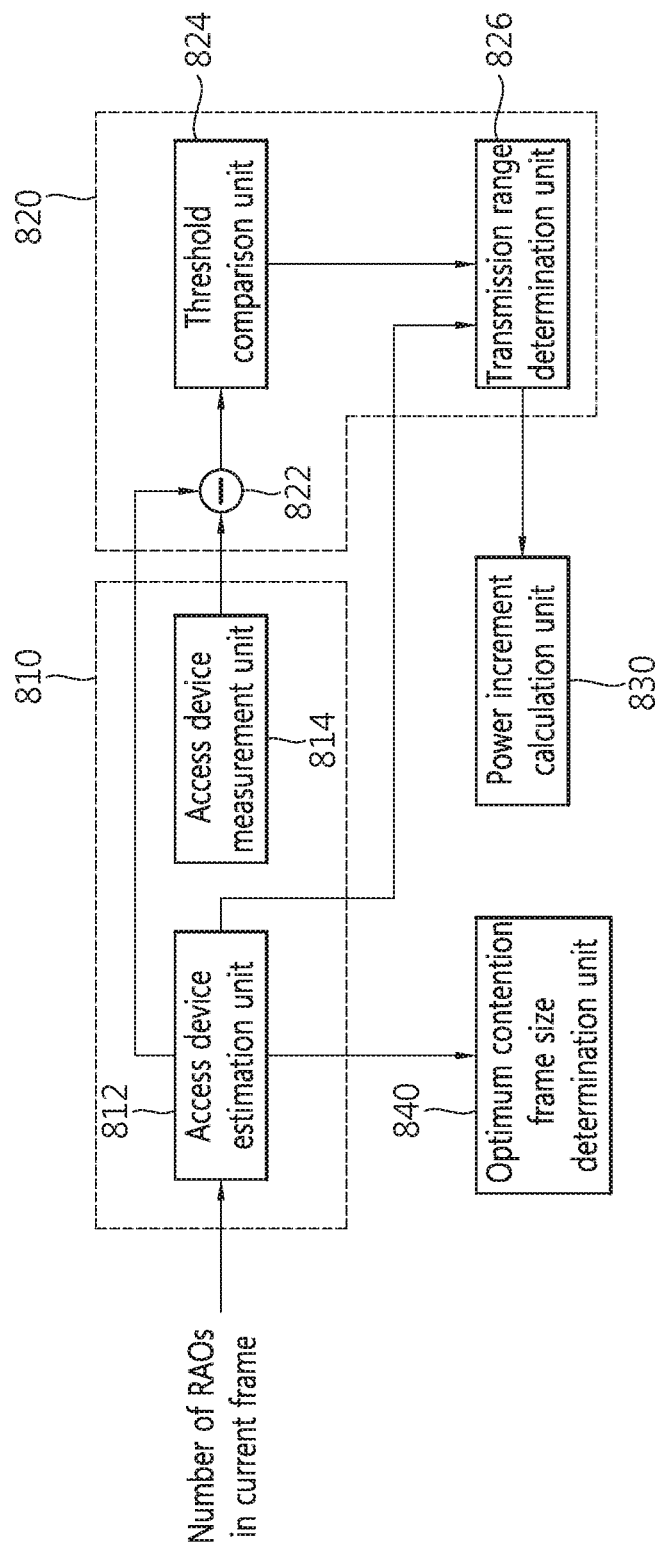
FIG. 8 is a block diagram schematically showing the configuration of a BS apparatus for transmission range expansion and the efficient allocation of resources in accordance with an embodiment of the present invention.

FIG. 8 is a block diagram schematically showing the configuration of a BS apparatus for transmission range expansion and the efficient allocation of resources in accordance with an embodiment of the present invention. As shown in FIG. 8, the small cell BS apparatus in accordance with an embodiment of the present invention may include a device number estimation/measurement unit 810, a transmission range expansion distance determination unit 820, a power increment calculation unit 830, and an optimum contention frame size determination unit 840.

Referring to FIG. 8, the device number estimation/measurement unit 810 may include an access device estimation unit 812 and an access device measurement unit 814. The access device estimation unit 812 estimates the number of devices which attempt access using a ratio of the number of RAOs in a current contention frame and the number of idle RAOs in the contention frame of a small cell BS inversely and estimates the number of expected success devices by multiplying the estimated number of access attempt devices and a success probability together. The access device measurement unit 814 monitors the number of success devices and measures the actual number of success devices in a single contention frame.

The transmission range expansion distance determination unit 820 may include a subtraction unit 822, a threshold comparison unit 824, and a transmission range determination unit 826. The subtraction unit 822 calculates a difference value by subtracting the estimated number of devices from the measured number of devices and sends the difference value to the threshold comparison unit 824. The threshold comparison unit 824 receives the difference value and compares the difference value with a threshold which may be set through a user interface. If, as a result of the comparison, the difference value is found to be smaller than the threshold, the threshold comparison unit 824 determines to not expand a transmission range. If the difference value is equal to or greater than the threshold, the threshold comparison unit 824 determines to expand the transmission range.

If the threshold comparison unit 824 determines to expand the transmission range, the transmission range determination unit 826 expands the transmission range based on the current transmission range so that the number of access attempt devices calculated by the access device estimation unit 812 is accommodated. The transmission range may be computed using a ratio of a maximum number of devices which may be accommodated by a macro BS and the transmission radius of the macro BS.

The power increment calculation unit 830 calculates a power increment to be increased in response to the expanded transmission radius. The power increment is computed based on a signal intensity value based on path loss values in a small cell BS and the macro BS. The power increment calculation unit 830 may determine the transmission power increment so that the signal intensity values of the small cell BS and the macro BS are the same in the expanded transmission range and may compute transmission power in a next contention frame by taking into consideration a maximum value and minimum value of the transmission power based on the determined transmission power increment.

The optimum contention frame size determination unit 840 determines an optimum contention frame size for allocating efficient resources, corresponding to the number of access attempt devices $\hat{N}_{PUE,i}$ calculated by the access device estimation unit 812, to a next contention frame. The number of RAOs, that is, the amount of optimal resources, maximizes the number of successfully accessed devices when a random contention is performed. Next, a process of maximizing RAOs which maximizes the success probability of Equation 3 is performed. The optimum contention frame size determination unit 840 may calculate an optimum contention frame size by differentiating $L_{pico,i+1}$, that is, the number of RAOs, and may finally determine an optimum contention frame size when a random contention is performed by taking into consideration the maximum contention frame size.

Simulation Results

Simulations according to an embodiment of the present invention were performed in terms of the random access efficiency and delay time of a macro BS. The random access efficiency is a probability that a device may be successfully accessed in a content when performing random access, and the delay time is the time taken for a device to be successfully accessed. For a comparison with the method in accordance with an embodiment of the present invention, a case where the method in accordance with an embodiment of the present invention had not been applied (i.e., fixed RAOs) were compared with a case where transmission range expansion (CRE) and optimal resource allocation (i.e., dynamic RAOs) according to an embodiment of the present invention had been stepwise applied. In the fixed RAOs, that is, the case where the method in accordance with an embodiment of the present invention had not been applied, the number of physical random access channels (PRACH) is divided into 1, 2, 5, and 10. The case where the method in accordance with an embodiment of the present invention had been applied is divided into a case where only optimal resource allocation was applied without transmission range expansion (i.e., dynamic RAOs without CRE) and a case where both transmission range expansion and optimal resource allocation were applied (i.e., dynamic RAOs with CRE). Other environment variables used in the simulations are listed in Table 1 below.

TABLE 1

| PARAMETERS | VALUES |
|---|---|
| Radius of macro cell $D_{macro}$ | 288 m |
| Maximum value of transmission power of macro BS $D_{tx\_macro}$ | 20 W |
| Maximum value of transmission power of pico BS $D_{tx\_pico}$ | 1 W |
| Maximum value of transmission power of UE | 200 mW |
| Frequency of arrived UE | 1000 to 3500 |
| Maximum number of preambles transmitted | 10 |
| Maximum number of HARQs transmitted | 5 |
| Maximum number of preambles | 54 |

Figure 9:
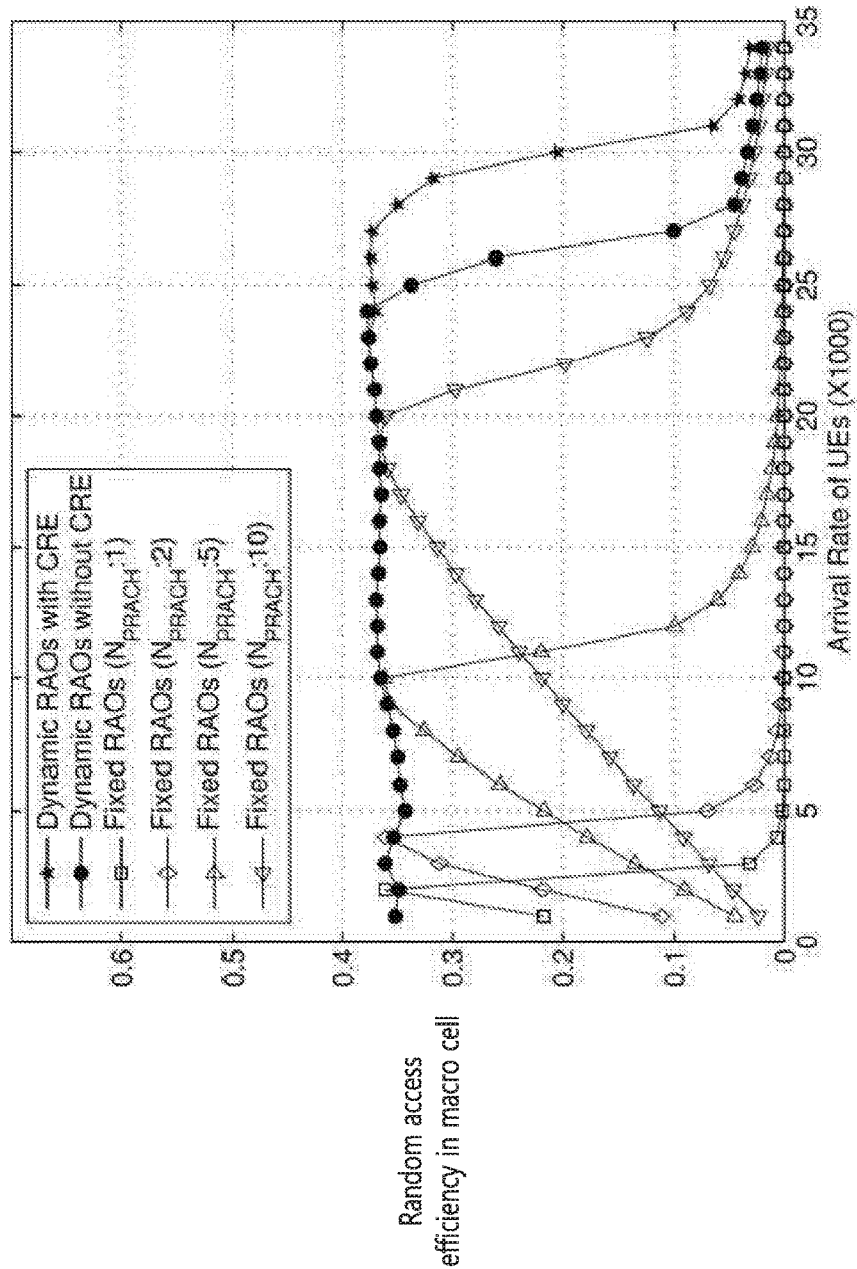
FIG. 9 is a graph showing an environment to which the method of expanding a transmission range and the method of efficiently allocating resources have been applied in accordance with an embodiment of the present invention and the random access efficiency of a macro BS in a conventional environment.

FIG. 9 is a graph showing an environment to which the method of expanding a transmission range and the method of efficiently allocating resources have been applied in accordance with an embodiment of the present invention and the random access efficiency of a macro BS in a conventional environment. Simulations were performed while frequency of the number of devices which attempted a random access contention was changed from 1,000/seconds to 35,000/seconds.

From FIG. 9, it may be seen that if the method in accordance with an embodiment of the present invention is not applied, random access efficiency is increased depending on the number of access attempt devices and reduced after a specific point of time. The reason for this is that since the fixed amount of resources is allocated, random access efficiency is increased until the amount of the allocated resources exceeds the number of access attempt devices, but access efficiency is reduced due to a collision between the devices when the number of access attempt devices exceeds the amount of the allocated resources.

In contrast, if the method in accordance with an embodiment of the present invention is applied, it may be seen that random access efficiency remains intact when only optimal resource allocation is applied, but access efficiency is reduced when the number of access attempt devices is 25,000/seconds or more. This is a problem in that the optimal amount of resources calculated by Equation 12 has not been allocated because the maximum amount of resources that may be allocated is exceeded. Furthermore, if both the optimal resource allocation and the transmission range expansion are applied, a point of time at which random access efficiency is reduced is delayed. The reason for this is that a load is distributed because the number of devices accommodated by the macro BS is reduced due to transmission range expansion of a pico BS. Accordingly, it may be seen that a method of distributing a load through the optimal resource allocation and transmission range expansion of a pico BS in accordance with an embodiment of the present invention improve random access efficiency of a device.

Figure 10:
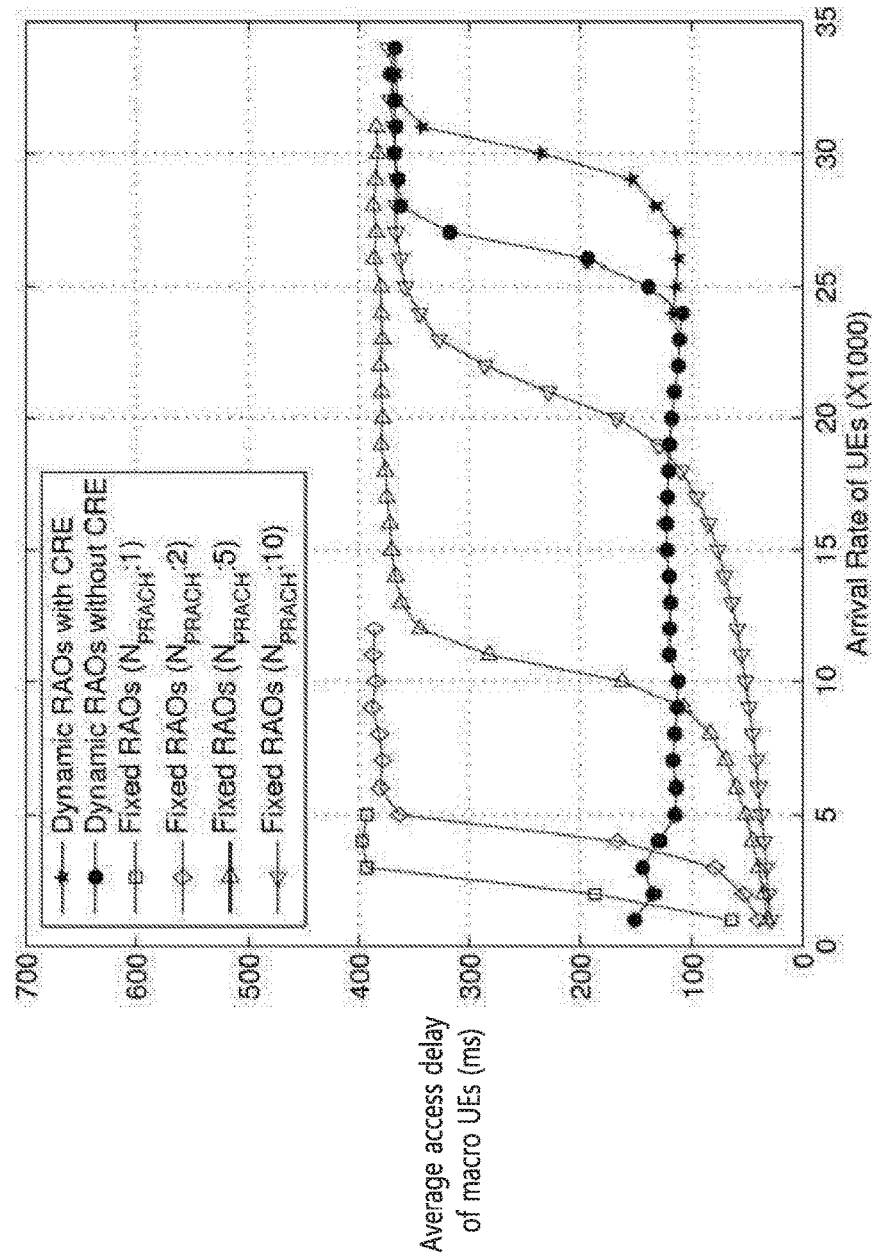
FIG. 10 is a graph showing a comparison between an environment to which the method of expanding a transmission range and the method of efficiently allocating resources have been applied in accordance with an embodiment of the present invention and the access delay time of a macro User Equipment (UE, i.e., device) in a conventional environment.

FIG. 10 is a graph showing a comparison between an environment to which the method of expanding a transmission range and the method of efficiently allocating resources have been applied in accordance with an embodiment of the present invention and the access delay time of a macro UEs in a conventional environment. In FIG. 10, simulations were performed while the number of devices which attempt a random access contention is changed from 1,000/seconds to 35,000/seconds.

From FIG. 10, it may be seen that if the method in accordance with an embodiment of the present invention has not been applied, performance of the delay time is gradually increased and the delay time is significantly increased at a specific point of time. The reason for this is that performance is deteriorated due to a collision because the number of devices which attempt access exceeds the amount of allocation resources.

If the method in accordance with an embodiment of the present invention has been applied, performance of the delay time remains intact and the delay time is significantly increased from a specific point of time. The reason for this is that a collision is frequently generated between devices which attempt access because the amount of resources that may be allocated reaches its limit. It may also be seen that while performance of the delay time remains intact, the value of the delay time if the method in accordance with an embodiment of the present invention has not been applied is higher than that before the delay time is increased if the method in accordance with an embodiment of the present invention has not been applied. From FIG. 10, it may be seen that in the case of the corresponding section, excessive resources have been allocated compared to the number of devices which attempt access, in which random access efficiency is increased depending on the number of accessed devices. Accordingly, it may be seen that the waste of resources is actually generated, resources are effectively allocated through a load distribution by the optimal resource allocation and transmission range expansion of a pico BS in accordance with an embodiment of the present invention, and performance of the delay time can be maintained to the extent that devices can be accommodated.

In accordance with the method of expanding, by a small cell BS, a transmission range and the base station apparatus using the same in accordance with the embodiments of the present invention, there are advantages in that a wide transmission range can be secured in a heterogeneous network and the transmission range of a pico BS installed in order to distribute a load of a macro BS providing services to a plurality of devices can be effectively controlled. In accordance with the method of expanding a transmission range, a pico BS can check the number of devices that may be further accommodated in the pico BS, can calculate a transmission range in which services corresponding to a corresponding difference may be provided, and can distribute a load of a macro BS to the greatest extent.

Furthermore, in accordance with the method of expanding, by a small cell BS, a transmission range and the base station apparatus using the same in accordance with the embodiments of the present invention, there are advantages in that a success probability when a device performs random access in each BS can be maximized and the delay time that is taken for a device to be accessed can be reduced because an efficiency resource allocation method is proposed based on the estimated number of access attempt devices.

The present invention has been described above with reference to the accompanying drawings and some embodiments, but the scope of the present invention should not be construed as being limited to the drawings or the embodiments. It is to be understood that those skilled in the art may modify and change the present invention in various ways without departing from the spirit and scope of the present invention written in the claims.

What is claimed is:

1. A method of expanding, by a small cell Base Station (BS), a transmission range in a heterogeneous network, the method comprising:
   estimating a number of success devices which successfully access the small cell BS through a contention based on an idle Random Access Opportunity (RAO);
   determining a transmission range expansion distance by comparing the estimated number of success devices with an actual number of measured success devices; and
   calculating a power increment necessary to expand a transmission range by incorporating the transmission range expansion distance based on a signal intensity value to which path loss values of the small cell BS and a macro BS have been applied.

2. The method of claim 1, wherein estimating of the number of success devices which successfully access the small cell BS comprises:
   calculating a ratio of idle RAOs in a contention frame of a previous random access process,
   estimating a number of devices that attempt access using the calculated idle RAO ratio inversely, and
   estimating the number of success devices based on the estimated number of devices which attempt access.

3. The method of claim 2, wherein the number of success devices in a specific i-th contention frame is calculated by a multiplication of a success probability value according to $$\hat{P}_{succ,i} = \hat{N}_{PUE,i} \frac{1}{L_{pico,i}} \left(1 - \frac{1}{L_{pico,i}}\right)^{\hat{N}_{PUE,i}-1},$$

where $L_{pico,i}$ is a contention frame size value, $\hat{N}_{PUE,i}$ is the estimated number of devices which attempt access to the small cell BS in the i-th contention frame, and $\hat{P}_{succ,i}$ is a probability that devices of $\hat{N}_{PUE,i}$ are able to be successfully accessed when the devices perform a contention in a contention frame having a size of $L_{pico,i}$.

4. The method of claim 3, further comprising calculating a number of RAOs which maximizes the number of success devices when a random contention is performed in order to allocate resources corresponding to the number of devices which attempt access, wherein the number of RAOs is a size of a contention frame.

5. The method of claim 4, wherein a number of RAOs which maximizes the number of success devices when the random contention is performed is calculated based on an optimum contention frame size calculated by differentiating a number of RAOs which maximizes a success probability of $$\hat{P}_{succ,i} = \hat{N}_{PUE,i} \frac{1}{L_{pico,i}} \left(1 - \frac{1}{L_{pico,i}}\right)^{\hat{N}_{PUE,i}-1}.$$

6. The method of claim 5, wherein the number of RAOs which maximizes the number of success devices when the random contention is performed is calculated by taking into consideration the calculated optimum contention frame size and a maximum contention frame size which is able to be allocated.

7. The method of claim 2, wherein the determining of the transmission range expansion distance comprises:
   determining whether a difference between the estimated number of success devices and the number of measured success devices exceeds a threshold,
   calculating a current transmission range, in response to a determination that the difference between the estimated number of success devices and the number of measured success devices exceeds the threshold, and
   calculating the transmission range expansion distance based on the current transmission range.

8. The method of claim 7, wherein the transmission range expansion distance is calculated using a ratio of a maximum number of devices which are able to be accommodated by the macro BS and a transmission radius of the macro BS.

9. The method of claim 1, further comprising:
   determining a transmission power increment in which a signal intensity value of the small cell BS and a signal intensity value of the macro BS become equal, and
   calculating transmission power in a next contention frame by taking into consideration a maximum value and minimum value of the transmission power based on the determined transmission power increment.

10. The method of claim 1, wherein a RAO value is calculated by multiplying a number of Physical Random Access CHannels (PRACH) by a number of preambles.

11. A small cell Base Station (BS) apparatus in a heterogeneous network, comprising:
    a processor configured to:
       estimate a number of success devices which successfully access the small cell BS through a contention based on an idle Random Access Opportunity (RAO); and
       determine a transmission range expansion distance by comparing the estimated number of success devices with an actual number of measured success devices,
    wherein a transmission range of the small cell BS is expanded based on the determined transmission range expansion distance.

12. The small cell BS apparatus of claim 11, wherein the processor is further configured to:
    calculate a ratio of idle RAOs in a contention frame of a previous random access process,
    estimate a number of devices that attempt access using the calculated idle RAO ratio inversely, and
    estimate the number of success devices based on the estimated number of devices which attempt access.

13. The small cell BS apparatus of claim 12, wherein the estimated number of success devices in a specific i-th contention frame is calculated by a multiplication of a success probability value calculated according to $$\hat{P}_{succ,i} = \hat{N}_{PUE,i} \frac{1}{L_{pico,i}} \left(1 - \frac{1}{L_{pico,i}}\right)^{\hat{N}_{PUE,i}-1},$$

where $L_{pico,i}$ is a contention frame size value, $\hat{N}_{PUE,i}$ is the number of devices which attempt access to the small cell BS in the i-th contention frame, and $\hat{P}_{succ,i}$ is a probability that devices of $\hat{N}_{PUE,i}$ are able to be successfully accessed if the devices perform a contention in a contention frame having a size of $L_{pico,i}$.

14. The small cell BS apparatus of claim 13, wherein the processor is further configured to calculate a number of RAOs which maximizes the number of success devices when a random contention is performed in order to allocate resources corresponding to the number of devices which attempt access.

15. The small cell BS apparatus of claim 12, wherein the processor is further configured to:
   determine whether a difference between the estimated number of success devices and the number of measured success devices exceeds a threshold,
   calculate a current transmission range, in response to a determination that the difference between the estimated number of success devices and the number of measured success devices exceeds the threshold, and
   calculate the transmission range expansion distance based on the current transmission range.

16. The small cell BS apparatus of claim 15, wherein the transmission range expansion distance is calculated using a ratio of a maximum number of devices which are able to be accommodated by a macro BS and a transmission radius of the macro BS.

17. The small cell BS apparatus of claim 11, wherein the processor is further configured to calculate a power increment necessary to expand the transmission range by incorporating the transmission range expansion distance based on a signal intensity value to which path loss values of the small cell BS and a macro BS have been applied.

18. The small cell BS apparatus of claim 17, wherein the processor is further configured to determine a transmission power increment in which a signal intensity value of the small cell BS and a signal intensity value of the macro BS become equal, and calculate transmission power in a next contention frame by taking into consideration a maximum value and minimum value of the transmission power based on the determined transmission power increment.

19. A heterogeneous network apparatus, comprising:
   a macro Base Station (BS) configured to receive random access requests from devices among a plurality of devices; and
   a small cell BS configured to estimate a number of success devices which access the small cell BS based on an idle Random Access Opportunity (RAO), determine a transmission range expansion distance by comparing the estimated number of success devices with an actual number of measured success devices in order to process random access requests from the devices while coexisting with the macro BS, and expand a transmission range of the small cell BS based on the determined transmission range expansion distance.

* * * * *